United States Patent [19]

Relja

[11] Patent Number: 5,067,742

[45] Date of Patent: Nov. 26, 1991

[54] QUICK HITCH ASSEMBLY FOR COUPLING A VEHICLE AND TRAILER

[76] Inventor: Frank S. Relja, HCR 64, Box #46, French Village, Mo. 63036

[21] Appl. No.: 564,569

[22] Filed: Aug. 9, 1990

[51] Int. Cl.$^5$ .............................................. B60D 1/40
[52] U.S. Cl. .................................. 280/479.2; 280/477; 280/482; 280/491.2
[58] Field of Search .................. 280/478.1, 477, 479.2, 280/479.3, 482, 491.1, 491.2, 491.5, 493, 494, 474

[56] References Cited

U.S. PATENT DOCUMENTS

| | | | |
|---|---|---|---|
| 3,093,395 | 6/1963 | Boutwell | 280/479.3 |
| 3,169,782 | 2/1965 | Columbus | 280/479.2 |
| 3,279,819 | 10/1966 | Edmonds | 280/479.3 |
| 3,378,280 | 4/1968 | Harms | 280/479.3 |
| 3,385,610 | 5/1968 | Vezina | 280/482 |
| 3,428,336 | 2/1969 | Thurman | 280/482 |
| 3,612,576 | 10/1971 | Marler | 280/479.3 |
| 3,860,267 | 1/1975 | Lyons | 280/479.3 |
| 4,421,340 | 12/1983 | Kramer et al. | 280/477 |
| 4,792,153 | 12/1988 | Galdes | 280/477 |
| 4,991,865 | 2/1991 | Francisco | 280/477 |

Primary Examiner—Kenneth R. Rice
Assistant Examiner—A. M. Boehler
Attorney, Agent, or Firm—Rogers, Howell & Haferkamp

[57] ABSTRACT

A quick hitch coupling apparatus for coupling a trailer provided with a hitch coupler and a vehicle provided with a tow bar receiver channel, includes a hitch sleeve and a tow bar. The hitch sleeve is fit slidably over the receiver channel of the vehicle and is releasably secured thereto. The tow bar is releasably and pivotally connected to the hitch sleeve at one end, and is provided with a hitch ball at its opposite end. The hitch ball is moved laterally from side to side to the position the ball beneath the hitch coupler of the trailer. It may be necessary to move the tow vehicle forward or rearward a short distance to position the tow bar ball directly beneath the trailer coupling. The trailer is then connected to the hitch ball, and the vehicle is moved forward to straighten the connections between the vehicle, the tow bar, and the trailer. The user then releases the connections between the hitch sleeve and receiver channel, and the hitch sleeve and the tow bar, and continues to back the vehicle toward the trailer to insert the tow bar into the receiver channel. The user then releasably secures the hitch sleeve to the receiver channel, and the receiver channel to the tow bar, to establish a connection between the trailer and vehicle that is equivalent to the connection provided by conventional receiver channel type trailer hitch assemblies.

11 Claims, 1 Drawing Sheet

QUICK HITCH ASSEMBLY FOR COUPLING A VEHICLE AND TRAILER

BACKGROUND OF THE INVENTION (1) Field of the Invention

The present invention relates to a quick hitch apparatus that facilitates the coupling of a vehicle to a trailer. In particular, the present invention relates to an apparatus that is connected between a vehicle and trailer, and is used to facilitate the alignment of a hitch ball connected to the vehicle with a hitch coupling of the trailer.

(2) Description of the Related Art

Conventional trailer hitch assemblies used in towing recreational trailers such as mobile homes, campers, and boat trailers, and used in towing utility trailers, are generally comprised of a hitch ball that is securely attached to the rearward end of the towing vehicle, and a hitch coupler that is securely attached to a forward end of a tongue assembly extending from the trailer. Often, the hitch ball of a conventional hitch assembly is mounted on a tow bar, and the tow bar is slidably received in a receiver channel that is secured to the vehicle. The tow bar is releasably secured in the receiver channel when the vehicle is towing a trailer, and is removed from the channel and stored when not in use. However, for the most part, the two component parts of a conventional trailer hitch assembly are fixedly secured to either the tow vehicle or the trailer, and are not capable of being moved relative to the tow vehicle or trailer to which they are secured.

This arrangement of the conventional trailer hitch assembly presents some difficulty for some in positioning the vehicle relative to the trailer to enable coupling the trailer hitch coupler to the hitch ball of the vehicle. Coupling the trailer to the vehicle requires the vehicle operator to back the vehicle to an exact position where the hitch ball will be positioned directly below the hitch coupler of the trailer. In some trailer hitch assemblies, this backing operation is made even more difficult by the vehicle operator's view of the trailer hitch coupler being obstructed by the back end of the vehicle as the vehicle is backed close to the hitch coupler. A second observer is often needed to give directions to the operator of the vehicle as he reverses the vehicle and attempts to position the hitch ball beneath the hitch coupler of the trailer. If a second person to observe the backing operation is not available, the operator of the vehicle must then reverse the vehicle to position the hitch ball as close as possible to the hitch coupler of the trailer, and then must manually move the trailer to position the hitch coupler directly above the hitch ball to effect the coupling of the trailer to the vehicle. With moderately sized trailers, manually moving the trailer to position the hitch coupler is very difficult. With larger sized trailers, it may be impossible to manually move the trailer to position the hitch coupler above the hitch ball.

A variety of trailer hitch assemblies have been developed to overcome the difficulties associated with conventional trailer hitch assemblies. Some of these modified trailer hitch assemblies include either a hitch ball or a trailer hitch coupler that are extended telescopically from the respective vehicle or trailer, and are then capable of swinging laterally from side to side to facilitate the positioning of the ball or coupler. Examples of these modified hitch assemblies are illustrated in the patents to Harms, U.S. Pat. No. 3,378,280; Marler, U.S. Pat. No. 3,612,576; Lyons, U.S. Pat. No. 3,860,267; and Glades, U.S. Pat. No. 4,792,153. A disadvantage associated with each of these modified trailer hitch assemblies is that they are comprised of elaborate assemblies that are attached to either the vehicle or the trailer to be towed. These elaborate assemblies in turn are comprised of many specialized component parts that add to the weight of the assemblies, and add to the cost of the trailer hitch assemblies overall.

It is an object of the present invention to provide a quick hitch vehicle and trailer coupling apparatus that makes extensive use of existing materials and component parts of conventional trailer hitch assemblies, and is accordingly inexpensive to manufacture.

It is also an object of the present invention to provide a quick hitch vehicle and trailer coupling apparatus that is light weight and is easily manipulated by a single person, and is completely separable from the tow vehicle and trailer when not in use.

It is also an object of the present invention to provide a quick hitch vehicle and trailer coupling apparatus that is quickly and easily attached between a vehicle and a trailer, and is easily employed to properly align the vehicle and trailer to facilitate the coupling of the trailer to the vehicle.

SUMMARY OF THE INVENTION

The quick hitch vehicle and trailer coupling apparatus is provided in two embodiments. A first embodiment of the invention is employed in coupling a vehicle having a receiver type hitch to a trailer. The second embodiment of the invention is employed in coupling a vehicle having a permanently mounted hitch ball to a trailer. Both embodiments of the invention are intended to be used with trailers having a third wheel assembly that is adjusted vertically to support the trailer tongue and hitch coupler in a horizontal position.

The first embodiment of the quick hitch vehicle and trailer coupling apparatus is generally comprised of a hitch sleeve and a tow bar. The hitch sleeve is configured to be slidably fitted over a receiver channel mounted on the tow vehicle. A first end of the hitch sleeve has a square cross section configuration that is dimensioned to slide over the exterior of the receiver channel. A pair of coaxial holes are provided on opposite sides of the hitch sleeve. The receiver channel is also provided with a pair of coaxial holes through its opposite sides. The holes are provided in the receiver channel to receive a pin that is also inserted through a hole in a conventional tow bar inserted in the channel to releasably secure the tow bar in the channel. The pair of holes in the hitch sleeve are aligned with the pair of holes in the receiver channel, and a connecting pin is inserted through the two pairs of aligned holes to serve as a means of releasably connecting the hitch sleeve to the receiver channel.

A pair of mutually opposed flanges extend from the second end of the hitch sleeve rearward of the receiver channel. The flanges are positioned on the top and bottom of the hitch sleeve, and are also provided with a pair of holes extending through the flanges. The flange holes are formed as elongated slots that extend parallel to the axis of the hitch sleeve and the receiver channel.

A wedge-shaped ramp extends laterally across the top surface of the bottom flange. The ramp extends upward from the top surface of the bottom flange to the bottom surface of the receiver channel interior when the hitch sleeve is fitted over the receiver channel.

In the preferred embodiment of the invention, the hitch sleeve is cut from a section of commercially available channel bar stock that has interior dimensions sufficiently large to enable the hitch sleeve to be slidably received over the receiver channel mounted on the tow vehicle.

The tow bar is also assembled from a length of commercially available channel bar stock, and is dimensioned to be slidably received in the receiver channel. A first end of the tow bar has a tapered end piece inserted therein. The tapered end piece facilitates the insertion of the first end of the tow bar into the interior of the vehicle receiver channel by sliding up the wedge-shaped ramp as the tow bar is moved toward the channel in a manner to be described. Also adjacent the first end of the tow bar is a pair of coaxial holes through the top and bottom surfaces of the tow bar. The coaxial holes are provided to line up with the pair of slots provided in the hitch sleeve flanges. By lining up the coaxial tow bar holes with the hitch sleeve slots, and inserting a second connecting pin through the aligned holes and slots, the pin serves as a means of releasably and pivotally connecting the tow bar to the second end of the hitch sleeve. By connecting the first end of the tow bar to the flanges of the hitch sleeve in this manner, the tow bar is enabled to pivot laterally from side to side through 180°.

A short distance behind the coaxial holes from the first end of the tow bar, a second pair of coaxial holes are provided in the tow bar. This second pair of coaxial holes are provided in the two sides of the tow bar, and are so positioned to line up with the pair of coaxial holes provided in the sides of the receiver channel when the tow bar is fully inserted into the interior of the receiver channel. A limit stop plate is provided on one or both sides of the tow bar to limit the extent of insertion of the first end of the tow bar into the receiver channel. When the tow bar is inserted to its fullest extent into the receiver channel so that the limit stop plate abuts against the rearward end of the channel, the second pair of coaxial holes in the sides of the tow bar will be lined up coaxially with the pair of coaxial holes provided in the sides of the receiver channel. This enables an operator of the apparatus to insert a connecting pin through the aligned holes of the hitch sleeve, receiver channel, and tow bar to releasably secure these three components together.

A conventional trailer hitch ball is secured at the second end of the tow bar. The hitch ball is sized to be releasably secured in the trailer hitch coupler of the trailer to be towed by the vehicle. The trailer hitch coupler to be connected to the hitch ball is a conventional assembly and does not make up part of the present invention.

In use, the hitch sleeve is first releasably secured to the receiver channel of the vehicle by slidably fitting the first end of the hitch sleeve over the receiver channel so that the pair of coaxial holes in the sides of the sleeve are aligned with the pair of coaxial holes in the sides of the receiver channel. With the hitch sleeve so positioned, the user then inserts the first connecting pin through the two pairs of aligned holes to serve as a means of releasably connecting the hitch sleeve to the receiver channel. Next, the user positions the first end of the tow bar between the top and bottom flanges of the hitch sleeve so that the first pair of coaxial holes in the top and bottom of the tow bar are aligned with the slots provided in the flanges of the sleeve. With the holes and slots aligned, the user then inserts the second connecting pin through the slots of the hitch sleeve flanges and the holes provided in the top and bottom of the tow bar to serve as a means of releasably and pivotally connecting the tow bar to the hitch sleeve. With the tow bar so connected to the hitch sleeve, the hitch ball on the second end of the tow bar is capable of being positioned by the user by laterally swinging the tow bar from side to side about the pivot connection provided by the second connecting pin. The pair of slots provided in the hitch sleeve flanges also enable the tow bar to be moved a limited distance toward the receiver channel so that the tapered end piece at the first end of the tow bar can be inserted into the interior of the channel without removing the second connecting pin from the pair of slots and the pair of holes in the tow bar.

With the hitch sleeve and two bar so connected to the vehicle, the user next reverses his vehicle and backs it up to a position approximate to the trailer hitch coupler of the trailer to be towed. The user then leaves the vehicle and manipulates the tow bar from side to side about the pivot connection provided by the second connector pin, to position the hitch ball at the second end of the tow bar beneath the hitch coupler of the trailer. The user may find that by swinging the tow bar, the hitch ball is not positioned directly beneath the trailer coupler. The user will then reenter the tow vehicle and move it either forward or backward until the ball is positioned directly beneath the trailer coupler. A second person could direct the driver of the tow vehicle to maneuver the tow vehicle so that the ball and coupler are so positioned as to accomplish the hookup. The user or second person then inserts the hitch ball into the hitch coupler and actuates the locking mechanism provided on conventional hitch couplers to securely hold the hitch ball in the hitch coupler. This provides a pivoting connection between the trailer and the tow bar. With the tow bar so connected between the vehicle and the trailer, the user then reenters the vehicle and drives it forward a small distance. The user drives the vehicle far enough forward to also tow the trailer forward a short distance. This aligns the connections between the vehicle receiver channel, the tow bar of the invention, and the trailer hitch coupler of the trailer. The forward movement of the vehicle and the pulling of the trailer is ceased once the connections between the vehicle receiver channel, the tow bar, and the trailer hitch coupler are aligned. The user then reverses the vehicle and drives it straight backwards toward the trailer for a short distance. This reversed movement causes the second connecting pin, connected between the flanges of the hitch sleeve and the first end of the tow bar, to slide forward in the slots of the hitch sleeve flanges. This forward movement of the second connecting pin enables the tapered end piece provided at the first end of the tow bar to slide up the wedge-shaped ramp on the bottom flange of the hitch sleeve into the interior of the receiver channel through the open rearward end of the channel. When the second connecting pin abuts against the forward end of the pair of slots, the user then stops the rearward movement of the vehicle. The user then exits the vehicle and removes the first connecting pin from its position through the aligned holes of the hitch sleeve and receiver channel, and also removes the second connecting pin from its position through the slots of the hitch sleeve flange and the pair of holes through the top and bottom of the first end of the tow bar. With the first and second connecting pins removed, the user then reenters the vehicle and continues to back the vehicle toward the trailer. As the vehicle is backed toward the trailer, the first end of the tow bar will slide through the receiver channel interior until the limit stop plate on the side of the tow bar abuts against the rearward end of the receiver channel. In this position, the pair of coaxial holes in the sides of the tow bar will be aligned with the pair of coaxial holes in the side of the receiver channel and the pair of coaxial holes in the sides of the hitch sleeve. The user then inserts one of the two connecting pins through the aligned holes of the hitch sleeve, receiver channel, and tow bar to releasably secure the tow bar to the receiver channel, thereby completing the quick hitch coupling of the vehicle to the trailer.

In a second embodiment of the invention, the quick hitch assembly for coupling a vehicle to a trailer is comprised of a tow bar having a hitch ball secured at one end, and a hitch coupler secured at its opposite end. This embodiment is employed in much the same manner as the first embodiment of the invention to facilitate the coupling of a vehicle hitch ball to the hitch coupler of a trailer.

BRIEF DESCRIPTION OF THE DRAWINGS

Further objects and features of the present invention are revealed in the following detailed description of the preferred embodiments of the invention and in the drawing Figures wherein.

DESCRIPTION OF THE PREFERRED EMBODIMENTS

The quick hitch coupling apparatus of the present invention is provided in two embodiments. A first embodiment is employed in facilitating the coupling of a vehicle having a receiver type hitch assembly to the hitch coupler of a trailer. The second embodiment of the invention is employed to facilitate the coupling of a vehicle having a permanently mounted hitch ball to the hitch coupling of a trailer. Both embodiments of the invention are intended to be used with trailers having a third wheel assembly that is adjusted vertically to support the trailer tongue and hitch coupler in a horizontal position.

Figure 1:
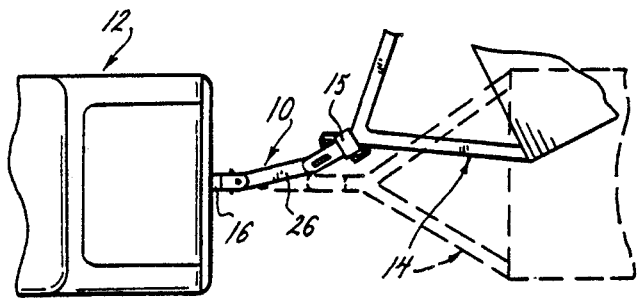
FIG. 1 is a segmented elevation view of a vehicle connected with a trailer employing the quick hitch coupling apparatus of the present invention.

FIG. 1 shows the first embodiment of the quick hitch coupling apparatus 10 of the present invention, connected between a tow vehicle 12 and a trailer 14 to be towed. The trailer is conventional, and includes a vertically adjustable third wheel or caster 15 that supports the trailer tongue in a horizontal position when disconnected from the vehicle. In this embodiment, the tow vehicle is provided with a receiver type hitch ball assembly. This assembly includes a square cross section receiver channel 16 that is permanently mounted to the frame of the vehicle 12. In conventional receiver type hitch assemblies, a tow bar having first and second ends is also provided. A first end of the tow bar is adapted to be inserted into the interior of the receiver channel, and the second end of the tow bar has a conventional trailer hitch ball secured thereto. A pair of holes 18 are provided in the sidewalls of the receiver channel. A hole is also provided through the sides of the tow bar adjacent its first end. The tow bar is inserted into the receiver channel interior a sufficient extent to align the holes in the sidewalls of the channel with the holes extending through the tow bar. With the holes aligned, a connecting pin 20 is inserted through the holes, and is secured in place by a cotter pin 22. This establishes a releasable, yet secure, connection between the tow bar and the vehicle frame, and enables the vehicle to tow a trailer coupled to the hitch ball at the second end of the tow bar.

The present invention replaces the conventional tow bar with a hitch sleeve 24 and a modified tow bar 26.

The hitch sleeve 24 is tubular, and has a square cross section. The sleeve is preferably cut from commercially available channel bar stock. The interior dimensions of the sleeve are determined to enable the sleeve to be slidably fitted over the exterior surface of the receiver channel 16. A pair of coaxial holes 28 are provided in the opposite sidewalls of the sleeve, and a pair of flanges 34 are secured to the top and bottom surfaces of the sleeve. The flanges 34 are secured by welding to the sleeve, or by any other functionally equivalent fastening means. The flanges project rearward to form the second end of the sleeve, and are provided with a pair of mutually opposed slots 36. The slots extend longitudinally, parallel with the axis of the sleeve. A wedge-shaped ramp 38 extends laterally across the top surface of the bottom flange. The ramp extends upward from the top surface of the bottom flange to the bottom surface of the receiver channel interior when the hitch sleeve is fitted over the receiver channel.

The tow bar 26 is formed from a length of channel bar stock having a square cross section. The tow bar may also be formed from a solid piece of bar stock. The exterior dimensions of the tow bar are determined to enable the bar to be slidably received in the interior 40 of the receiver channel. A first end of the bar 42 is open and has a tapered end piece 44 inserted therein. A dowel pin 46 secures the end piece on the first end of the tow bar. Each of the forward edges of the end piece 44 are beveled to assist in centering the first end of the tow bar 26 in the interior 40 of the receiver channel 16, and in inserting the first end of the tow bar through the channel interior. A first pair of coaxial holes 48 are provided through the top and bottom surfaces of the tow bar 26 just behind the tapered end piece 44. The axis of the first pair of holes 48 is vertical relative to the tow bar. A second pair of coaxial holes 50 are provided through the sidewalls of the tow bar 26 a short distance behind the first pair of holes 48. The axis of the second pair of holes 50 is horizontal relative to the tow bar. A limit stop plate 52 is secured to a side of the tow bar a short distance behind the second pair of coaxial holes 50. The distance between the second pair of coaxial holes 50 and a forward edge of the stop plate 52 is equal to the distance between the pair of coaxial holes 18 in the sides of the receiver channel 16 and the rearward edge 54 of the receiver channel. A trailer hitch ball 56 is mounted at the second end 58 of the tow bar 26. The hitch ball 56 has a threaded stud shaft 60 extending from its bottom that is inserted through a third pair of coaxial holes 62 extending through the second end of the tow bar. The hitch ball 56 is secured in place by a nut fastener 64 that is threaded onto the end of the stud shaft 60 that projects from the bottom of the tow bar.

A second connecting pin 68 releasably and pivotally connects the tow bar 26 to the hitch sleeve 24. The connecting pin 68 is inserted through the pair of slots 36 in the hitch sleeve 24, and the first pair of coaxial holes 48 through the first end of the tow bar 26. The second pin 68 is secured in place by a cotter pin 70 to establish the pivoting releasable connection between the tow bar and sleeve.

In use, the operator of the vehicle 12 first removes the conventional tow bar (not shown) from the receiver channel 16 of the vehicle. With the conventional tow bar removed, the user of the quick hitch coupling apparatus first slidably fits the first end of the hitch sleeve 24 over the receiver channel 16, and aligns the pair of holes 28 in the sleeve with the pair of holes 18 in the sides of the channel. Once the holes are aligned, the user then inserts the first connecting pin 20 through the holes and secures the pin in place with the cotter pin 22 to provide a means of releasably securing the hitch sleeve 24 to the receiver channel 16.

The user next assembles the tow bar 26 of the invention to the second end of the hitch sleeve 24. The first end 42 of the tow bar is positioned between the opposed flanges 34 of the sleeve, and the pair of coaxial vertical holes 48 in the first end of the tow bar are aligned with the opposed slots 36 in the flanges of the sleeve. With the first pair of holes 48 of the tow bar aligned with the slots 36 of the sleeve flanges, the user then inserts the second connecting pin 68 vertically through the aligned pair of holes and slots and secures the pin in place with a cotter pin 70 to provide a means of releasably and pivotally connecting the tow bar 26 to the second end of the hitch sleeve 24. With this pivoting connection established between the tow bar and the hitch sleeve, the tow bar is capable of swinging laterally from side to side through 180° behind the tow vehicle. This enables the hitch ball 56 at the second end of the tow bar to be easily positioned beneath the trailer hitch coupler 66 of the trailer 14.

With the tow bar now pivotally secured to the hitch sleeve, and the hitch sleeve releasably secured to the receiver channel, the user now reverses the vehicle 12 and backs up to a position near the hitch coupler 66 of the trailer 14. The user next exits the vehicle and manipulates the tow bar 26, by pivoting it about the second connecting pin 68, to position the hitch ball 56 at the second end of the tow bar beneath the hitch coupler 66 of the trailer. It may be necessary for the user to reenter the vehicle and move vehicle 12 forward or rearward to line up the hitch ball 56 with trailer hitch coupler 66. The user then lowers the trailer hitch coupler 66 and releasably connects the hitch ball 56 in the coupler 66 to establish a pivoting connection between the tow bar and the trailer. The structure of the trailer hitch coupler 66 is conventional and does not make up part of the present invention, and therefore is not described in detail. Trailer hitch couplers of the type with which the present invention is employed are varied and well known in the art, and any type of hitch coupler that is designed to be connected to a conventional trailer hitch ball may be employed with the present invention.

With the hitch sleeve 24 releasably secured to the receiver channel 16, the tow bar 26 pivotally secured to the hitch sleeve, and the trailer hitch coupler 66 pivotally secured to the tow bar, the user next reenters the vehicle 12 and drives the vehicle forward a short distance to pull the trailer 14 and straighten out the connections between the hitch sleeve, tow bar, and trailer hitch coupler. This is schematically illustrated in FIG. 1, where the trailer 14 is shown in solid lines as being positioned at an angle to the vehicle 12, and is shown in phantom lines in its position aligned with the vehicle once the vehicle has pulled the trailer forward a short distance.

Figure 2:
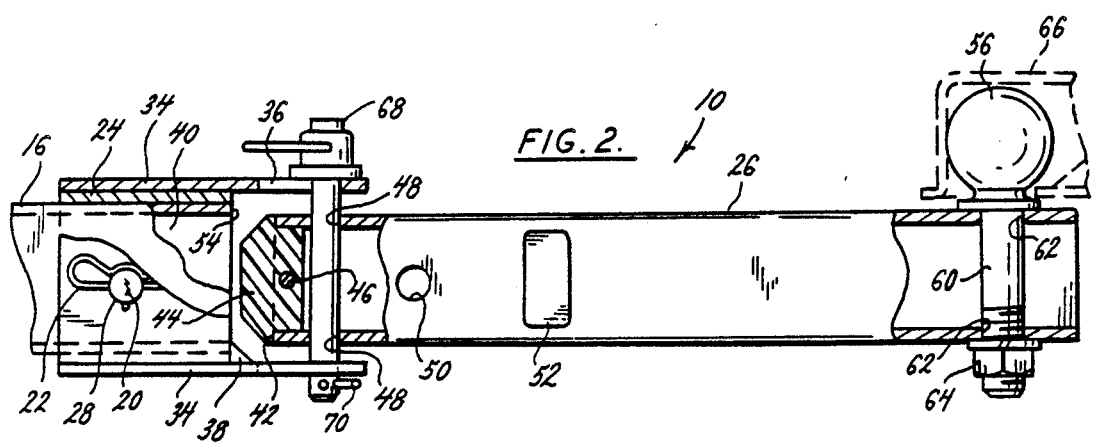
FIG. 2 is an elevation view partially in section of the quick hitch coupling apparatus of the present invention.
Figure 3:
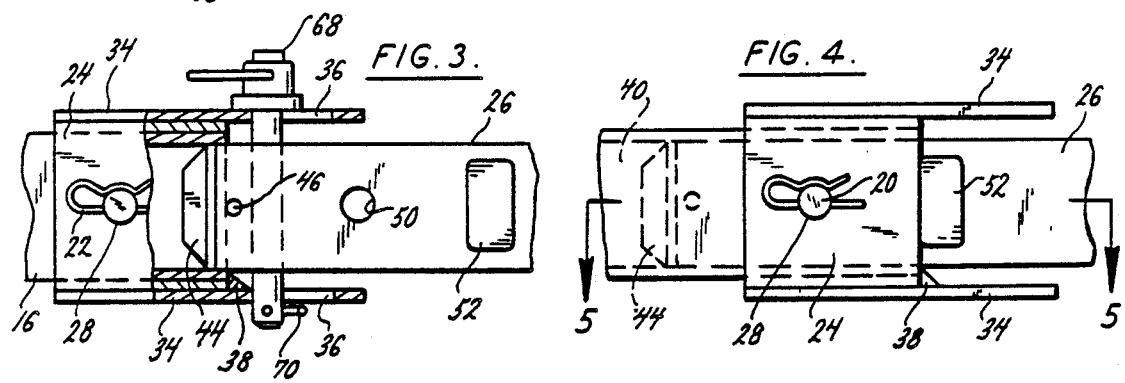
FIG. 3 is a segmented elevation view partially in section of the quick hitch coupling apparatus of the present invention showing initial insertion of the tow bar into the receiver channel interior.
Figure 4:
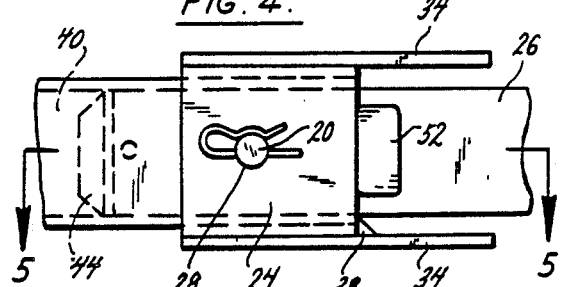
FIG. 4 is a segmented elevation view showing the tow bar of the invention fully inserted into the receiver channel and releasably secured by a connecting pin.
Figure 5:
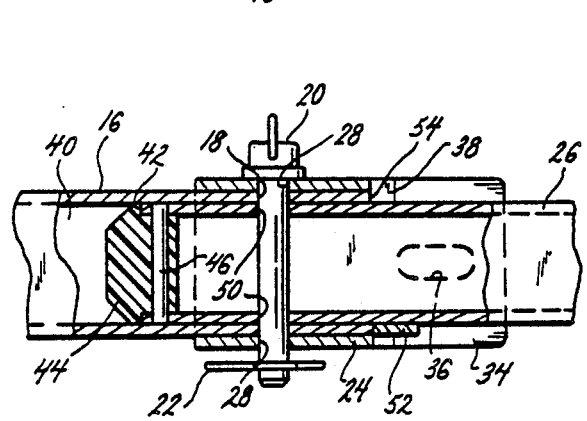
FIG. 5 is a segmented plan view partially in section, taken along the line 5—5 in FIG. 4.

With the connections between the vehicle and the trailer straightened, the user now reverses the vehicle and backs the vehicle toward the trailer a short distance. This will cause the receiver channel 16 and hitch sleeve 24 to move toward the right as viewed in FIG. 2, relative to the tow bar 26. This is due to the slots 36 connecting the hitch sleeve to the first end of the tow bar. As the vehicle is reversed, the second pin 68 will move from its position shown in FIG. 2 at the right side of the slots 36, to the position shown in FIG. 3 at the extreme left side of the slots. As the hitch sleeve 24 moves rightward relative to the first end of the tow bar 26, the tapered end piece 44 directs the first end of the tow bar up the ramp 38 and into the open end of the receiver channel 16, and causes the first end of the tow bar to be inserted into the interior of the receiver channel a slight distance. As the user reverses the vehicle, he will feel when the second connecting pin 68 engages with the extreme left side of the slots 36 in the hitch sleeve flanges, as this engagement will begin to push the trailer backward. Once the user feels the engagement of the second connecting pin 68 with the left side of the slots 36, the user then exits the vehicle and removes the first and second connecting pins 20, 68 from their respective connections between the hitch sleeve and receiver channel, and the hitch sleeve and tow bar. The user then reenters the vehicle and continues to back the vehicle toward the trailer. This will cause the first end of the tow bar 26 to slide through the interior of the receiver channel 16 until the limit stop plate 52 provided on the side of the tow bar engages the rearward edge 54 of the channel. Once again, the user will feel the engagement between the stop plate 52 and the end of the channel as this will cause the vehicle to push backward on the trailer. When the limit stop plate 52 engages the rearward edge of the receiver channel 54, the second pair of coaxial holes 50 in the tow bar 26 will be aligned with the pair of coaxial holes 18 in the sidewalls of the receiver channel 16, and the pair of coaxial holes 28 in the sides of the hitch sleeve 24. The user then exits the vehicle and reinserts the first connecting pin 20 through the aligned pairs of holes of the hitch sleeve 24, receiver channel 16, and tow bar 26. This establishes a releasable connection between the tow bar and receiver channel, and establishes the quick hitch coupling between the vehicle and the trailer that will enable the user to tow the trailer in the same manner as conventional type receiver trailer hitches. The user then raises the vertically adjustable third wheel 15 secured to the trailer tongue to its maximum height to support the trailer tongue on the hitch ball 56. The trailer is then ready for towing.

Figure 6:
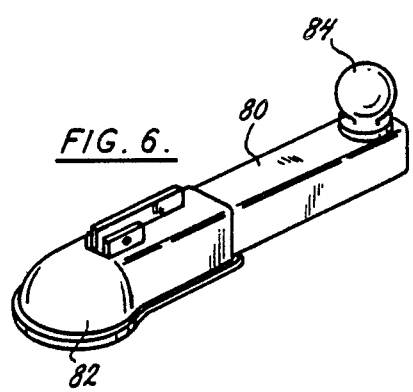
FIG. 6 is a perspective view of a second embodiment of the quick hitch coupling apparatus of the present invention.

FIG. 6 shows a second embodiment of the quick hitch coupling apparatus of the present invention. This embodiment of the invention is intended to be used with vehicles having permanently mounted trailer hitch balls.

As in the first embodiment, the second embodiment of the invention comprises a tow bar 80 having first and second ends. A trailer hitch coupler assembly 82 is secured to the first end of the tow bar, and a trailer hitch ball 84 is secured at the second end of the tow bar. The hitch coupler assembly 82 is substantially identical to hitch coupler assemblies usually employed at the end of a trailer tongue.

In use, the user of the quick hitch coupling apparatus first reverses his vehicle to position the hitch ball of the vehicle near to the hitch coupler of the trailer to be towed. The user then attaches the hitch coupler 82 of the apparatus to the hitch ball of the vehicle, and then manipulates the tow bar 80 to position the hitch ball 84 at the second end of the tow bar beneath the hitch coupler of the trailer. The hitch ball 84 is then connected with the hitch coupler of the trailer to provide a pivoting connection between the vehicle and the tow bar, and the tow bar and the trailer. As in the first embodiment, the user then drives the vehicle forward to cause the tow bar 80 to pull the trailer forward and align the connections between the vehicle, tow bar and trailer. With the vehicle and trailer aligned, the user then exits the vehicle and removes the second embodiment of the quick hitch coupling apparatus from its pivoting connections with the vehicle hitch ball and the trailer hitch coupler. With the apparatus removed, the user then reenters the vehicle and backs the vehicle straight back toward the hitch coupler of the trailer, stopping the vehicle when the hitch ball of the vehicle is positioned beneath the hitch coupler of the trailer. The user then exits the vehicle and attaches the hitch coupler of the trailer to the hitch ball of the vehicle in the usual way.

It should be apparent from the descriptions of the two embodiments of the invention presented above, and the descriptions of how the two embodiments of the invention are used in coupling a vehicle to a trailer, that both embodiments facilitate the heretofore difficult task of properly positioning a vehicle trailer hitch ball beneath the hitch coupler of a trailer in order to couple the trailer to the vehicle.

While the present invention has been described by reference to specific embodiments, it should be understood that modifications and variations of the invention may be constructed without departing from the scope of the invention defined in the following claims.

What is claimed is:

1. An apparatus for use in quick hitch coupling a trailer to a vehicle, where the trailer is provided with a hitch coupler and the vehicle is provided with a tow bar receiver channel having a hollow interior and a pair of holes extending laterally therethrough, the apparatus comprising:
   a hitch sleeve having first and second ends, the first end being adapted to fit slidably over the receiver channel and to be releasably secured thereto, and the second end being adapted to extend rearward from the receiver channel; and
   a tow bar having first and second ends, the first end being adapted to be releasably and pivotally connected to the second end of the sleeve, and being further adapted to be inserted into and slidably received in the receiver channel, and the second end being adapted to be releasably and pivotally connected to the hitch coupler of the trailer.

2. The apparatus of claim 1, further comprising:
   a first pair of coaxial holes through the first end of the hitch sleeve and a first connecting pin adapted to be inserted through the coaxial holes, the first pair of holes being arranged to align with the pair of receiver channel holes when the first end of the sleeve is fit over the receiver channel, and the connecting pin being adapted to be inserted through the aligned holes of the sleeve and receiver channel to releasably secure the sleeve to the channel.

3. The apparatus of claim 2, further comprising:
   a second pair of holes through the second end of the hitch sleeve, a third pair of holes through the first end of the tow bar, and a second connecting pin adapted to be inserted through the second and third pairs of holes, the third pair of holes being arranged to be inserted between and aligned with the second pair of holes to enable insertion of the second connecting pin through the aligned second and third pairs of holes to releasably and pivotally connect the first end of the tow bar to the second end of the sleeve.

4. The apparatus of claim 1, further comprising
   a first pair of holes through the second end of the hitch sleeve, a second pair of holes through the first end of the tow bar, and a connecting pin adapted to be inserted through the first and second pairs of holes, the second pair of holes being arranged to be inserted between and aligned with the first pair of holes to enable insertion of the connecting pin through the aligned pairs of holes to releasably and pivotally connect the first end of the tow bar to the second end of the sleeve.

5. The apparatus of claim 1, wherein:
   the hitch sleeve includes a pair of mutually opposed flanges that extend rearward from its second end.

6. The apparatus of claim 4, wherein:
   the hitch sleeve includes a pair of mutually opposed flanges that extend rearward from its second end, and the first pair of holes are provided in the pair of flanges.

7. The apparatus of claim 4, wherein:
   the first pair of holes are formed as longitudinal slots that are parallel to the hitch sleeve axis, the pair of slots enabling limited relative movement between the first end of the tow bar and the second end of the sleeve when the tow bar is connected to the sleeve.

8. The apparatus of claim 7, wherein:
   the pair of slots are arranged to enable limited forward movement of the tow bar relative to the hitch sleeve to enable insertion of the first end of the tow bar into the receiver channel, and to enable limited rearward movement of the tow bar relative to the sleeve to retract the first end of the tow bar from the receiver channel and enable the tow bar to pivot from side to side while connected to the hitch sleeve.

9. The apparatus of claim 2, wherein:
   the tow bar is provided with a hole extending laterally through the bar adjacent its first end, the hole being adapted to align with the first pair of holes through the hitch sleeve and the pair of receiver channel holes when the tow bar is received in the receiver channel, and the connecting pin being adapted to be inserted through the aligned holes of the tow bar, receiver channel, and hitch sleeve to releasably secure the sleeve to the channel and the tow bar in the channel.

10. The apparatus of claim 6, wherein:
the opposed flanges are arranged to enable the tow bar to pivot from side to side through 180° when releasably connected to the second end of the hitch sleeve.

11. A method of quick hitch coupling a trailer to a vehicle, where the trailer is provided with a hitch coupler and the vehicle is provided with a tow bar receiver channel, the method including the steps of:
providing a hitch sleeve having a first end adapted to be slidably fit on the receiver channel and releasably connected thereto, and a second end adapted to extend rearward from the receiver channel;
providing a tow bar having a first end adapted to be releasably and pivotally connected to the second end of the sleeve, and being further adapted to be inserted into and slidably received in the receiver channel, and having a second end adapted to be releasably and pivotally connected to the hitch coupler of the trailer;
slidably fitting the hitch sleeve over the receiver channel and securing the sleeve thereto;
pivotally connecting the first end of the tow bar to the second end of the receiver channel;
pivotally connecting the second end of the tow bar to the hitch coupler;
driving the vehicle and pulling the trailer forward a sufficient distance to align the axes of the interconnected channel, sleeve, tow bar and coupler;
releasing the connections between the sleeve and channel, and the sleeve and tow bar;
reversing the vehicle causing the first end of the tow bar to be inserted into the channel, and causing the tow bar to be slidably received in the channel; and
reconnecting the sleeve to the channel and the channel to the tow bar received in the channel.

* * * * *